United States Patent
Cheong et al.

(10) Patent No.: US 10,754,800 B2
(45) Date of Patent: Aug. 25, 2020

(54) STORAGE DEVICE CONFIGURED TO UPDATE FIELD PROGRAMMABLE GATE ARRAY AND METHOD OF OPERATING THE SAME

(71) Applicant: Samsung Electronics Co., Ltd., Suwon-si, Gyeonggi-do (KR)

(72) Inventors: WooSeong Cheong, Suwon-si (KR); Seonghoon Woo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/181,813

(22) Filed: Nov. 6, 2018

(65) Prior Publication Data

US 2019/0155767 A1 May 23, 2019

(30) Foreign Application Priority Data

Nov. 17, 2017 (KR) .................. 10-2017-0154277
Jul. 9, 2018 (KR) .................. 10-2018-0079421

(51) Int. Cl.
*G06F 13/16* (2006.01)
*G06F 13/42* (2006.01)
*G06F 12/02* (2006.01)

(52) U.S. Cl.
CPC ...... *G06F 13/1694* (2013.01); *G06F 12/0246* (2013.01); *G06F 13/4282* (2013.01); *G06F 2212/1044* (2013.01); *G06F 2212/2022* (2013.01); *G06F 2212/262* (2013.01); *G06F 2213/0028* (2013.01); *G06F 2213/0032* (2013.01)

(58) Field of Classification Search
CPC ............. G06F 13/1694; G06F 12/0246; G06F 13/4282
See application file for complete search history.

(56) References Cited

U.S. PATENT DOCUMENTS

| | | | |
|---|---|---|---|
| 6,640,334 B1 * | 10/2003 | Rasmussen | G06F 8/65 717/169 |
| 8,161,227 B1 * | 4/2012 | Diggs | G06F 3/0626 365/185.14 |
| 8,566,507 B2 | 10/2013 | Sprinkle et al. | |
| 8,917,111 B1 * | 12/2014 | Puranik | H03K 19/17748 326/38 |
| 8,938,704 B1 | 1/2015 | Rele et al. | |
| 9,577,641 B2 | 2/2017 | Raychowdhury et al. | |

(Continued)

FOREIGN PATENT DOCUMENTS

| | | |
|---|---|---|
| JP | 2002-342085 A | 11/2002 |
| JP | 2003-510705 A | 3/2003 |
| KR | 10-2015-0027391 A | 3/2015 |

*Primary Examiner* — Tim T Vo
*Assistant Examiner* — Phong H Dang
(74) *Attorney, Agent, or Firm* — Harness, Dickey and Pierce, P.L.C.

(57) ABSTRACT

A storage device includes a controller and a nonvolatile memory device. The controller includes a field programmable gate array (FPGA) and receives an FPGA image for updating the FPGA from an outside in response to a first command received from the outside. The nonvolatile memory device stores the FPGA image. The controller receives the FPGA image through a main interface or a sideband interface, and executes the FPGA image in response to a second command received from the outside.

23 Claims, 14 Drawing Sheets

(56) References Cited

U.S. PATENT DOCUMENTS

| | | | |
|---|---|---|---|
| 2003/0177223 A1* | 9/2003 | Erickson | G06F 8/71 709/224 |
| 2008/0052700 A1* | 2/2008 | Han | G06F 8/65 717/168 |
| 2010/0199125 A1* | 8/2010 | Reche | G06F 11/108 714/6.22 |
| 2012/0051746 A1* | 3/2012 | Ohtou | H04B 10/0779 398/58 |
| 2012/0120740 A1* | 5/2012 | Shim | G11C 16/14 365/189.14 |
| 2013/0167134 A1* | 6/2013 | Shim | G06F 8/654 717/173 |
| 2014/0101653 A1* | 4/2014 | Dharmadhikari | G06F 8/65 717/173 |
| 2015/0019777 A1* | 1/2015 | Venkata | G06F 13/4282 710/110 |
| 2015/0242202 A1* | 8/2015 | Jun | G06F 3/0679 717/168 |
| 2016/0203049 A1* | 7/2016 | Kim | G11C 29/42 714/721 |
| 2017/0070573 A1* | 3/2017 | Takase | H04L 67/1097 |
| 2017/0228404 A1 | 8/2017 | Saeki et al. | |

* cited by examiner

STORAGE DEVICE CONFIGURED TO UPDATE FIELD PROGRAMMABLE GATE ARRAY AND METHOD OF OPERATING THE SAME

CROSS-REFERENCE TO RELATED APPLICATIONS

This application claims priority under 35 U.S.C. § 119 to Korean Patent Application Nos. 10-2017-0154277 filed on Nov. 17, 2017, and 10-2018-0079421 filed on Jul. 9, 2018, in the Korean Intellectual Property Office, the disclosures of which are incorporated by reference herein in their entireties.

BACKGROUND

Example embodiments relates to a semiconductor device. For example, at least some example embodiments relate to a storage device configured to receive an FPGA image through a main interface or a sideband interface.

Semiconductor memories may be classified into volatile memory devices, which lose data stored therein at power-off, such as a static random access memory (SRAM), a dynamic RAM (DRAM), and a synchronous DRAM (SDRAM), and nonvolatile memory devices, which retain data stored therein even at power-off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

A controller for controlling such a semiconductor memory generally includes a hardware module, a function block, a circuit, etc. for the purpose of performing various functions. The hardware module, the function block, the circuit, etc. may be implemented in the controller, and various kinds of electronic devices each including the controller and the semiconductor memory are supplied to an end user. However, once an electronic device is supplied to the end user, it may be difficult to upgrade the hardware module, the function block, the circuit, etc. constituting the controller. Therefore, a field programmable gate array (FPGA) may be included in the controller for the purpose of implementing an upgradable specific function.

To upgrade the specific function of the controller, the FPGA may be updated. In this case, an external memory such as a compact flash (CF) card is used to receive, from the outside, an FPGA image associated with updating the FPGA. However, a separate dedicated circuit for receiving the FPGA image may be utilized to read the external memory, thereby causing an increase in costs, an increase in the chip size, etc.

SUMMARY

Example embodiments provide a storage device which receives an FPGA image through a main interface or a sideband interface.

According to an example embodiment, a storage device may include a nonvolatile memory device; and a controller including a field programmable gate array (FPGA), the controller configured to, receive, via a main interface or a sideband interface, an FPGA image from outside the storage device in response to a first command received from the outside, store the FPGA image in the nonvolatile memory device, and execute the FPGA image stored in the nonvolatile memory device in response to a second command received from the outside to update the FPGA.

According to an example embodiment, a storage device may include a nonvolatile memory device; and a controller including an application specific integrated circuit (ASIC) and a field programmable gate array (FPGA), the FPGA configured to perform at least a part of functions of the ASIC, the controller configured to, receive an FPGA image from outside the storage device through a main interface or a sideband interface, store the FPGA image in the nonvolatile memory device, and execute the FPGA image to update the functions performed by the FPGA.

According to an example embodiment, a method of operating a storage device which includes a nonvolatile memory device, and a controller controlling the nonvolatile memory device and including a field programmable gate array (FPGA), the method including receiving an FPGA image from outside the storage device through a main interface or a sideband interface in response to a first command received from the outside; storing the FPGA image in the nonvolatile memory device; loading the FPGA image stored in the nonvolatile memory device in response to a second command received from the outside; and executing the FPGA image loaded from the nonvolatile memory device in response to the second command.

BRIEF DESCRIPTION OF THE FIGURES

The above and other objects and features of the present disclosure will become apparent by describing in detail example embodiments thereof with reference to the accompanying drawings.

DETAILED DESCRIPTION

Below, example embodiments of the present disclosure may be described in detail and clearly to such an extent that an ordinary one in the art easily implements the present disclosure.

Components described in the detailed description with reference to terms "part", "unit", "module", etc. and function blocks illustrated in drawings may be implemented with software, hardware, or a combination thereof. In an example embodiment, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
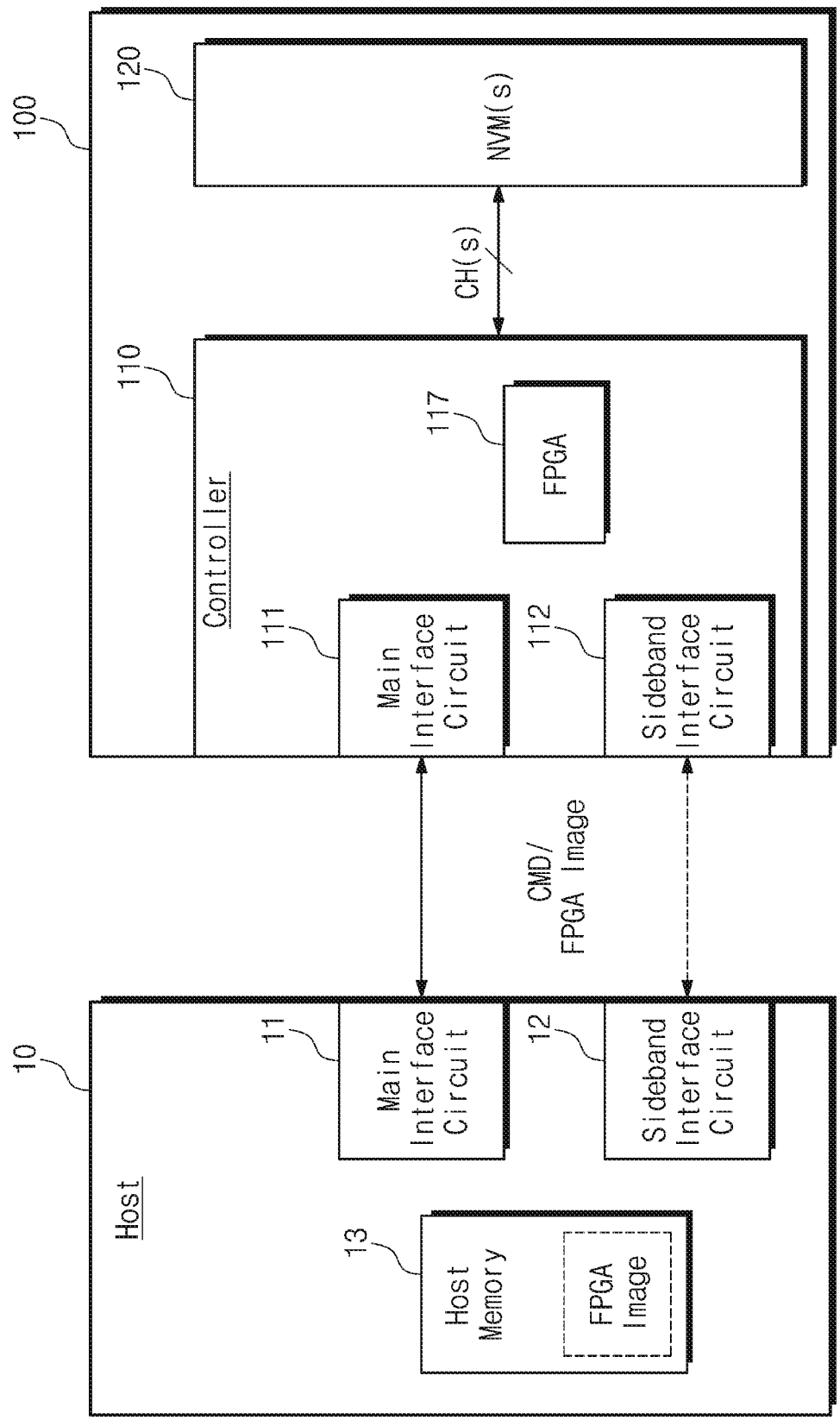
FIG. 1 is a block diagram illustrating a configuration of a storage device according to an example embodiment of the present disclosure.

FIG. 1 is a block diagram illustrating a configuration of a storage device 100 according to an example embodiment of the present disclosure.

Referring to FIG. 1, an example embodiment is illustrated as the storage device 100 is connected to a host 10.

The host 10 may include a main interface circuit 11, a sideband interface circuit 12, and a host memory 13. The host 10 may provide a service to a user by communicating with the storage device 100. For example, the host 10 may provide the storage device 100 with data to be stored in the storage device 100, and may receive data read from the storage device 100. In addition, the host 10 may allow a controller 110 of the storage device 100 to be updated in hardware and/or in software.

The host memory 13 may store data which for communicating with the storage device 100. For example, the host memory 13 may store write data to be stored in the storage device 100, and may store read data read from the storage device 100. In addition, the host memory 13 may store data which are used for managing the storage device 100. For example, the host memory 13 may store a field programmable gate array (FPGA) image which is used for updating an FPGA 117.

The storage device 100 may include the controller 110 and a nonvolatile memory device 120. The controller 110 may include a main interface circuit 111, a sideband interface circuit 112, and the FPGA 117.

The controller 110 may control overall operations of the storage device 100. For example, the controller 110 may perform a read operation and/or a write operation in response to a command received from the host 10. For example, the communication between the host 10 and the storage device 100 may be performed through the main interface circuits 11 and 111. For example, the main interface circuits 11 and 111 may communicate with each other in compliance with a peripheral component interconnect express (PCIe) interface protocol.

However, this is an example. One or more of various interface protocols such as USB, small computer system interface (SCSI), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS) may be adopted for the communication between the main interface circuits 11 and 111.

The controller 110 may be configured to update the FPGA 117 provided in the controller 110 in response to a command CMD received from the host 10. For example, the FPGA image may be received for communication between the main interface circuits 11 and 111. The command CMD received to update the FPGA 117 may be a write command or a vendor-specific command. The controller 110 may receive the FPGA image from the host 10 in response to the command CMD. Additionally/alternatively, the FPGA image may be performed for communication between the sideband interface circuits 12 and 112.

The sideband interface circuits 12 and 112 may communicate with each other in compliance with the protocol defined in the management component transport protocol (MCTP) specification or a system management bus (SM-Bus) specification. In this example, each of the sideband interface circuits 12 and 112 may adopt a universal asynchronous receiver transmitter (UART), an inter-integrated circuit (I2C), and/or a serial programming interface (SPI) as a physical layer. However, the examples are not intended to limit the present disclosure. The sideband interface circuits 12 and 112 may adopt one or more of various sideband interface protocols for the purpose of assisting the main interface circuits 11 and 111.

The nonvolatile memory device 120 may include a plurality of nonvolatile memories for storing data. For example, in the case where the nonvolatile memory device 120 includes NAND-type flash memories, the nonvolatile memory device 120 may include memory cell arrays formed along a plurality of word lines and a plurality of cell strings connected to a bit line, from among a plurality of bit lines.

However, the above example does not limit the present disclosure. The nonvolatile memory device 120 may include one or more of various nonvolatile memory devices such as an electrically erasable and programmable ROM (EEPROM), a NOR flash memory, a phase-change RAM (PRAM), a resistive RAM (ReRAM), a ferroelectric RAM (FRAM), a spin-torque magnetic RAM (STT-MRAM), etc.

According to the configuration briefly described above, the FPGA image for updating the FPGA 117 may be received from the host 10 through a main interface or a sideband interface. In general, since a dedicated circuit which may connect an external memory (e.g., a CF card) used to receive the FPGA image is not required, the chip size and manufacturing costs may be reduced. In addition, since an existing main interface and/or an existing sideband interface are used, the efficiency of FPGA update may be improved.

Figure 2:
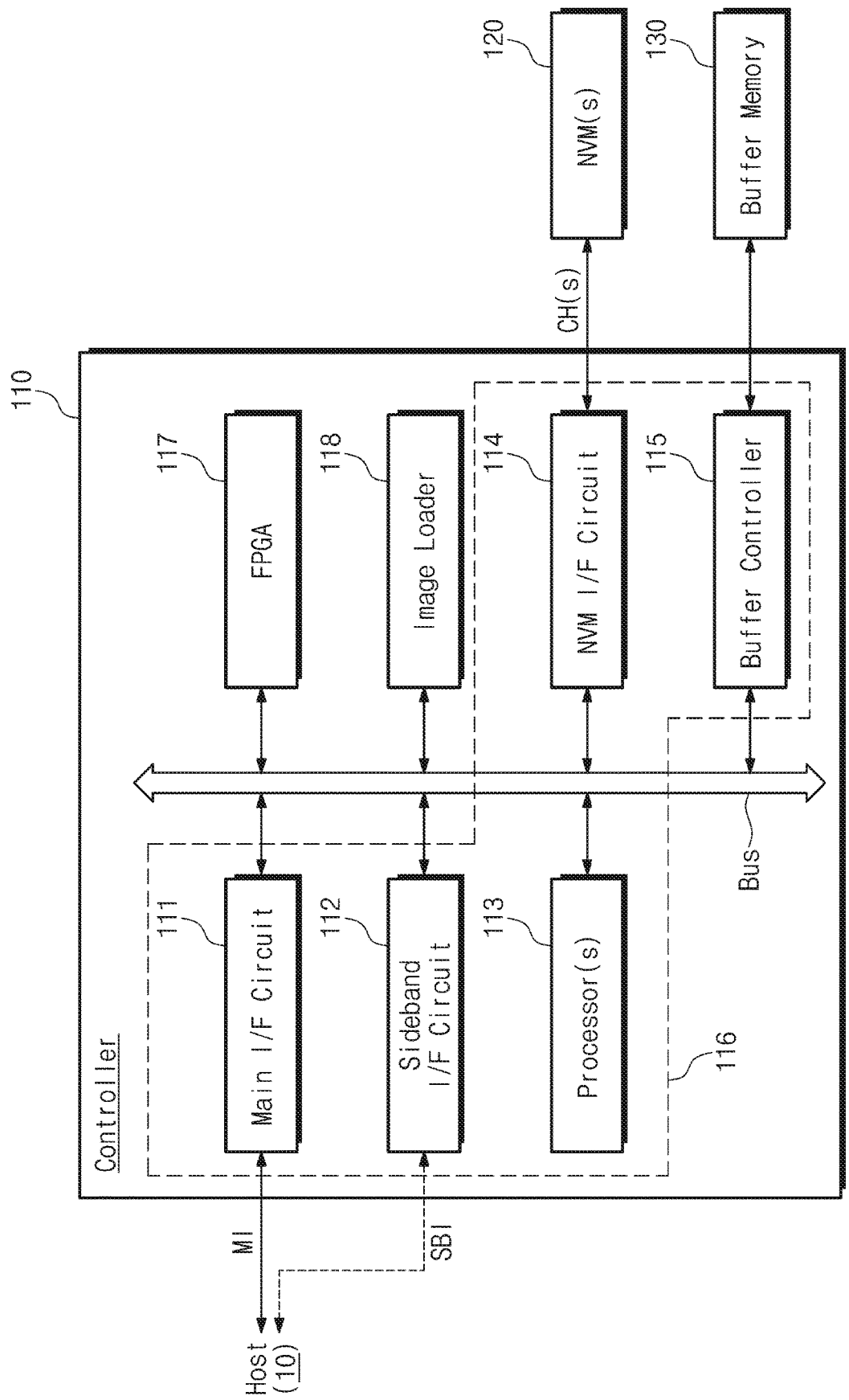
FIG. 2 is a block diagram illustrating an example configuration of a controller illustrated in FIG. 1.

FIG. 2 is a block diagram illustrating an example configuration of the controller 110 illustrated in FIG. 1. The controller 110 may further include a processor 113, a nonvolatile memory interface circuit 114, and a buffer controller 115, in addition to the main interface circuit 111, the sideband interface circuit 112, and the FPGA 117.

The main interface circuit 111 and the sideband interface circuit 112 may communicate with the host 10 in compliance with the above-described protocols.

The processor 113 may control overall operations of the controller 110. The processor 113 may drive various firmware/software for driving the controller 110 or for controlling the nonvolatile memory device 120. For example, the processor 113 may drive a flash translation layer (FTL) for managing a mapping table in which a relationship between logical addresses and physical addresses of the nonvolatile memory device 120 is defined. The processor 113 may execute various commands and/or instructions received from the host 10. For example, the processor 113 may process a command associated with an FPGA image to be received through a main interface MI or a sideband interface SBI.

The nonvolatile memory interface circuit 114 may perform interfacing with the nonvolatile memory device 120. For example, the nonvolatile memory interface circuit 114 may be connected with the nonvolatile memory device 120 through a plurality of channels. The buffer controller 115 may manage/control a buffer memory 130.

Meanwhile, the main interface circuit 111, the sideband interface circuit 112, the processor 113, the nonvolatile memory interface circuit 114, the buffer controller 115, etc. which are described above may be manufactured as an application specific integrated circuit (ASIC) 116. Although not illustrated in FIG. 2, the ASIC 116 may further include a ROM which stores a boot code for booting up the storage device 100 and an ECC circuit which detects and corrects an error of data loaded from the nonvolatile memory device 120.

The FPGA 117 may be configured to implement at least some of functions of plural hardware intellectual properties (IPs) constituting the ASIC 116. For example, when updating a function of a specific hardware IP, it may be difficult (or, alternatively, impossible) to replace the specific hardware IP. In this case, a function of the specific hardware IP to be updated may be implemented by using the FPGA image received through the main interface MI or the sideband interface SBI from the host 10.

An image loader 118 may load the FPGA image received from the host 10. For example, the FPGA image stored in the nonvolatile memory device 120 or the buffer memory 130 may be loaded and executed in response to a command received from the host 10.

Figure 3A:
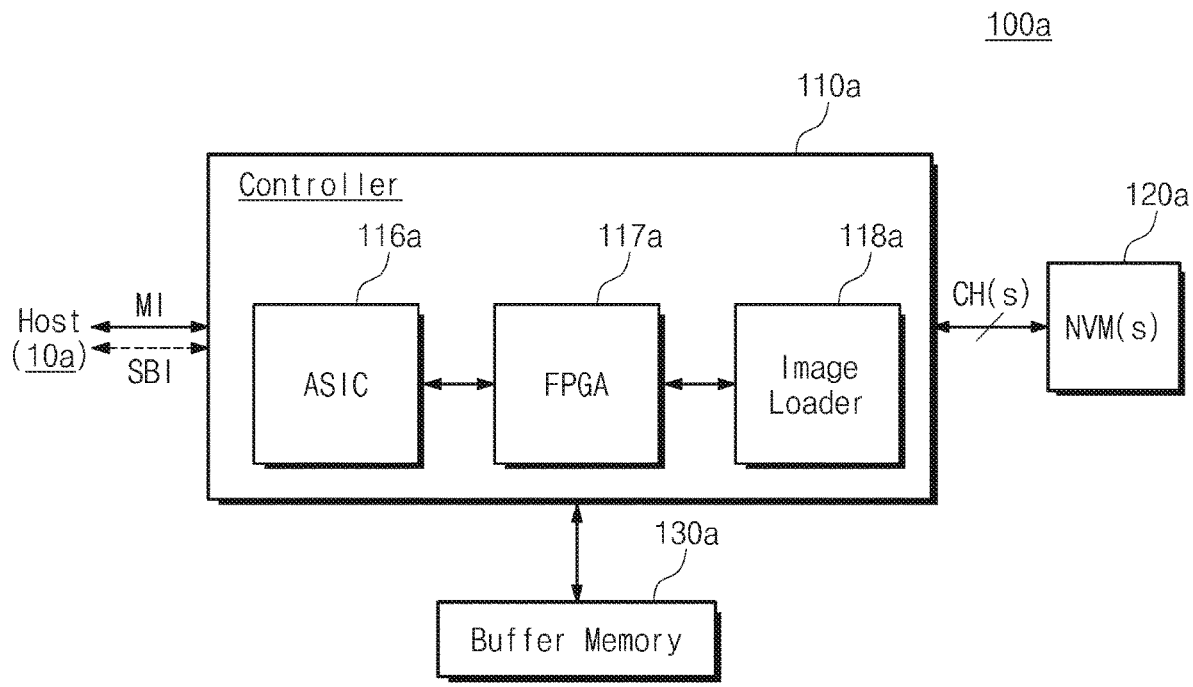
FIGS. 3A, 3B, and 3C are block diagrams illustrating example configurations of a controller of FIG. 2.
Figure 3B:
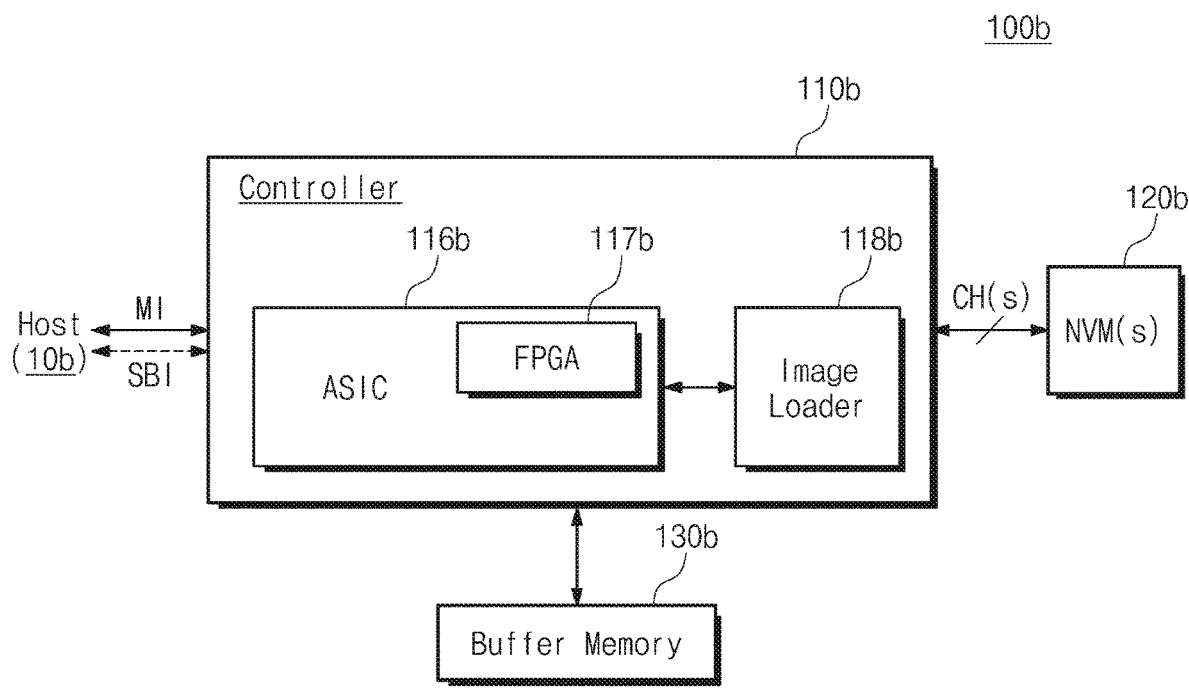
Figure 3C:
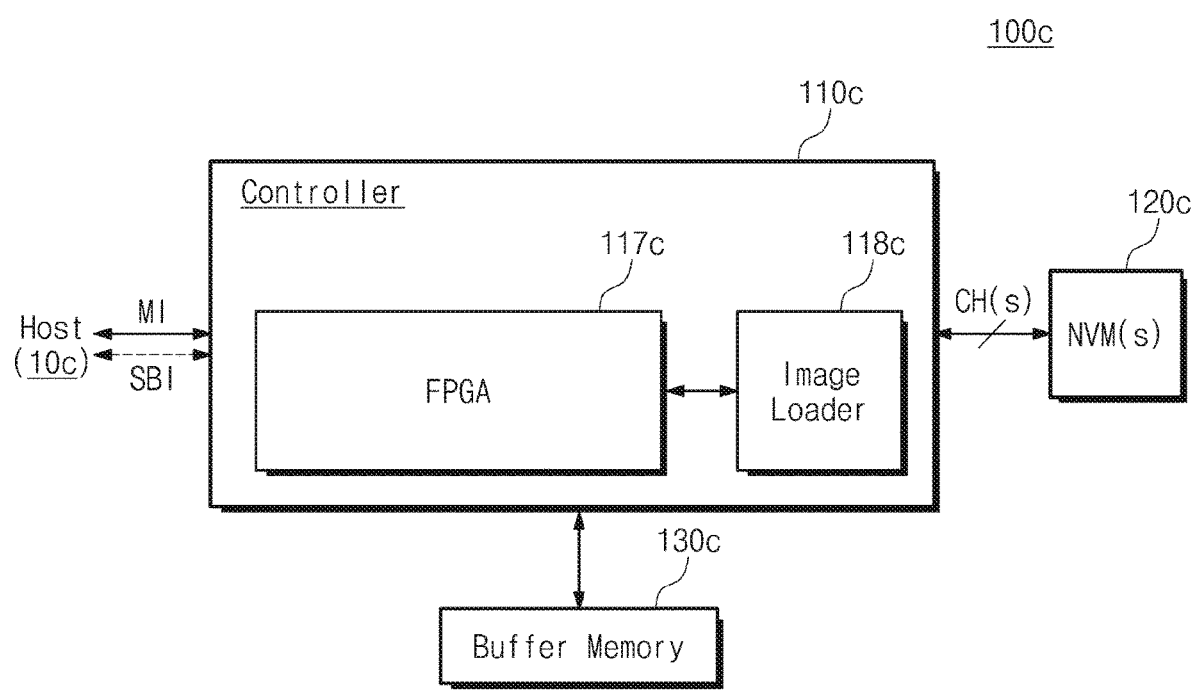

FIGS. 3A, 3B, and 3C are block diagrams illustrating example configurations of a controller of FIG. 2. Hardware IPs described with reference to FIG. 2 may be manufactured in various manners. For example, at least a part of hardware IPs constituting a controller may be implemented with an ASIC and/or an FPGA. FIG. 2 will be referenced together for better understanding.

Referring to FIG. 3A, a controller 110*a* may include an ASIC 116*a*, an FPGA 117*a*, and an image loader 118*a*. The ASIC 116*a* may include the main interface circuit 111, the sideband interface circuit 112, the processor 113, the nonvolatile memory interface circuit 114, and the buffer controller 115, each of which is implemented with a hardware module. The FPGA 117*a* may be configured such that at least a part of functions of the ASIC 116*a* is implemented through a program. For example, the ASIC 116*a* and the FPGA 117*a* may be respectively mounted on one board or may be manufactured in a package on package (PoP) manner.

Referring to FIG. 3B, a controller 110*b* may include an ASIC 116*b*, an FPGA 117*b*, and an image loader 118*b*. Unlike the embodiment of FIG. 3A, the FPGA 117*b* may be implemented within the ASIC 116*b*. That is, the ASIC 116*b* and the FPGA 117*b* may be implemented with one chip.

Referring to FIG. 3C, a controller 110*c* may include an FPGA 117*c* and an image loader 118*c*. Unlike the above-described embodiments, the controller 110*c* may not include hardware IPs of FIG. 2. Instead, the FPGA 117*c* may be configured to implement functions of hardware IPs of FIG. 2.

However, the present disclosure is not limited to the example configurations described with reference to FIGS. 3A to 3C. That is, the present disclosure may be applied to various configurations for receiving the FPGA image for FPGA update through a main interface circuit or a sideband interface circuit.

Figure 4:
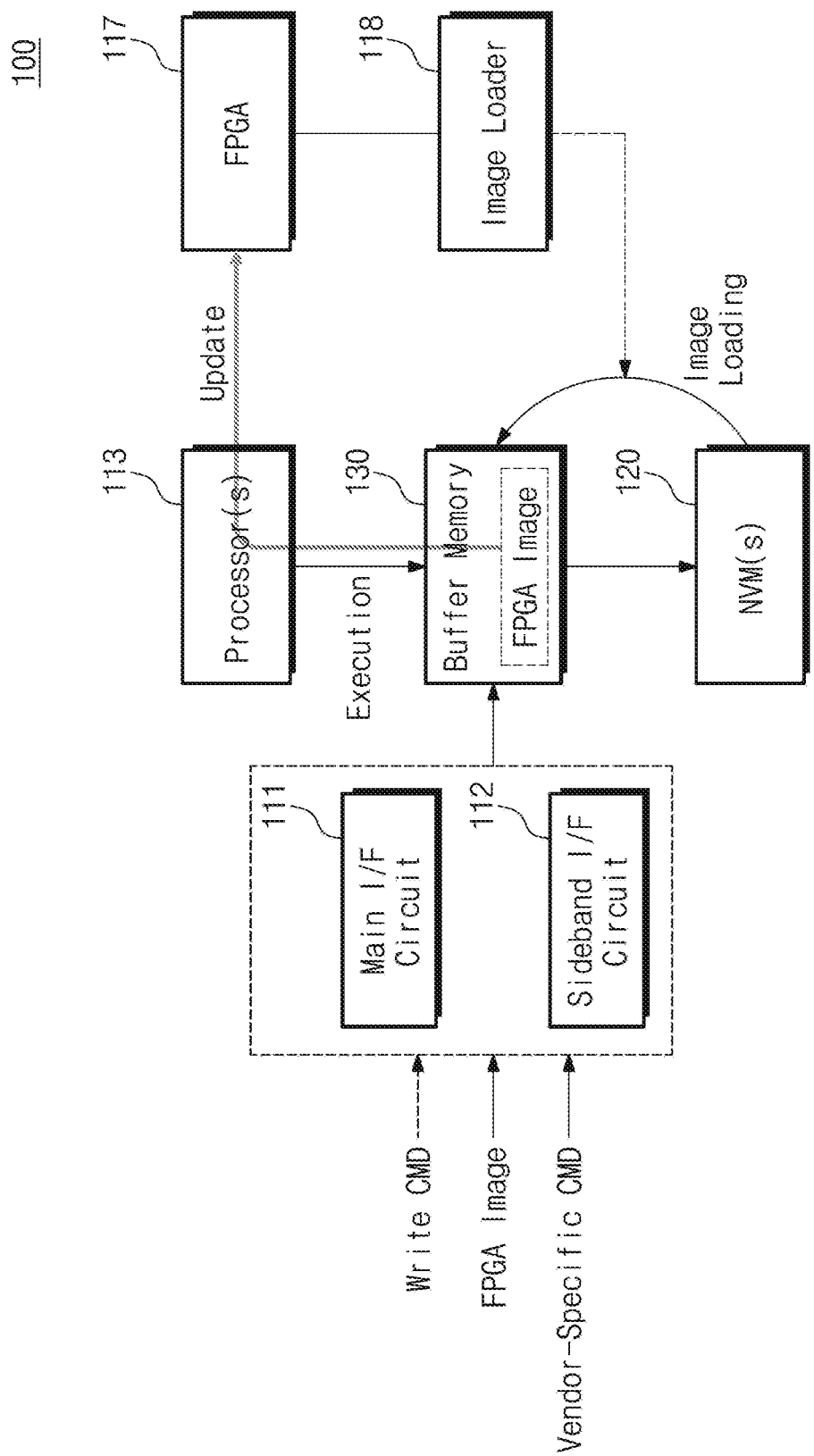
FIG. 4 is a block diagram illustrating a detailed operation of a storage device according to an example embodiment of the present disclosure.
Figure 5:
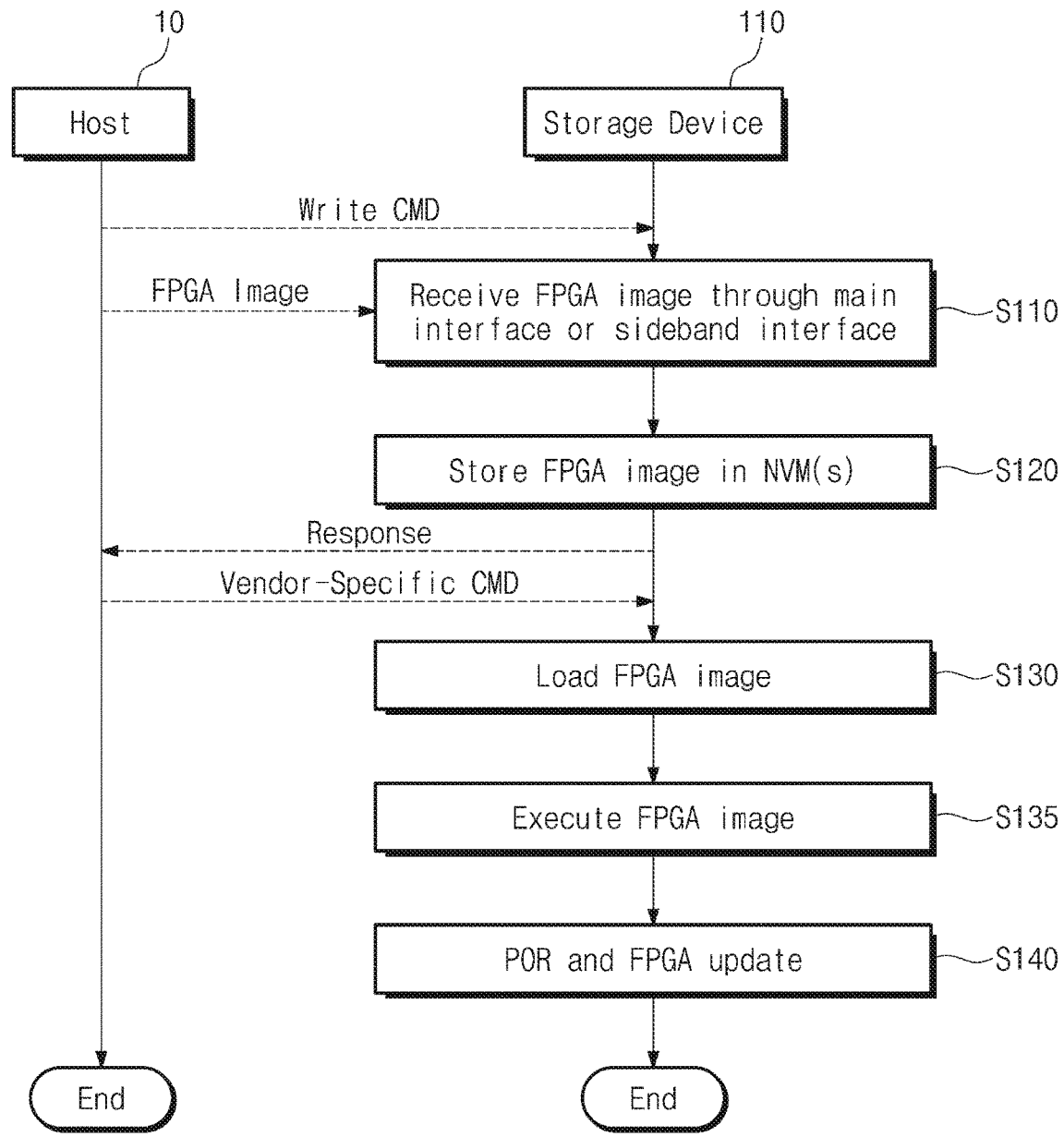
FIG. 5 is a flowchart illustrating an operation of a storage device illustrated in FIG. 4.

FIG. 4 is a block diagram illustrating a detailed operation of a storage device according to an example embodiment of the present disclosure. FIG. 5 is a flowchart illustrating an operation of a storage device illustrated in FIG. 4. For better understanding, a description will be given with reference to FIGS. 2, 4, and 5 together.

The host 10 may generate a write command for transmitting the FPGA image to the storage device 100 and may transmit the write command to the storage device 100. Although not illustrated in FIGS. 4 and 5, an address of a nonvolatile memory device, at which the FPGA image will be stored, may be transmitted together with the write command.

The storage device 100 may receive the FPGA image through a main interface or a sideband interface (S110). The FPGA image may include a command, a program code, etc. for the purpose of updating at least a part of functions of hardware IPs constituting the controller 110. The received FPGA image may be stored in the nonvolatile memory device 120 (S120). In an example embodiment, the FPGA image may be stored in the nonvolatile memory device 120 after being encrypted. In this case, a dedicated circuit and/or software, firmware, etc. for encrypting the FPGA may be further provided.

In the case where the FPGA image is completely stored, the controller 110 may transmit, to the host 10, a response indicating that the FPGA image is completely stored. The host 10 may transmit the vendor-specific command to the controller 110 in response to the response received from the controller 110. For example, the vendor-specific command may be transmitted to the controller 110 through the main interface circuit 111 or the sideband interface circuit 112.

The controller 110 may load the FPGA image stored in the nonvolatile memory device 120 in response to the vendor-specific command (S130). In detail, the image loader 118 may load the FPGA image stored in the nonvolatile memory device 120 onto the buffer memory 130. However, in another embodiment, the image loader 118 may load the FPGA image stored in the nonvolatile memory device 120 onto the image loader 118. In this case, the image loader 118 may include separate storage for storing the loaded FPGA image.

The controller 110 (more specifically, the processor 113) may execute the loaded FPGA image in response to the vendor-specific command (S135). Afterwards, a power on reset (POR) operation of the storage device 100 may be performed, and some functions of hardware IPs targeted for update may be updated (S140). However, in another embodiment, even though the power on reset operation of the storage device 100 is not performed, a function of the updated FPGA 117 may be immediately executed.

Figure 6:
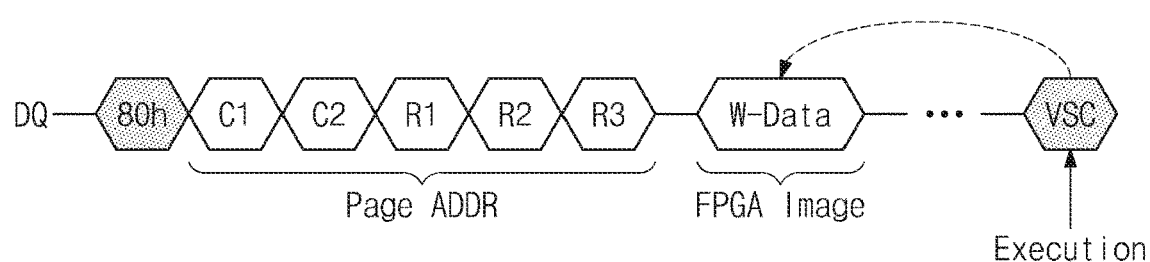
FIG. 6 is a diagram illustrating signals transmitted from a host to a storage device, in the example embodiment of FIG. 4.

FIG. 6 is a diagram illustrating signals transmitted from the host 10 to the storage device 100, in the embodiment of FIGS. 4 and 5. For better understanding, a description will be given with reference to FIGS. 4 and 5 together.

To update the FPGA update, the host 10 may generate a write command 80*h* and a logical address of a region where the FPGA image will be stored, and may transmit the command 80*h* and the logical address to the storage device 100. An embodiment is illustrated as the logical address is a page address of the nonvolatile memory device 120.

Addresses C1 and C2 indicate a column address of a page, and addresses R1, R2, and R3 indicate a row address of the page. Even though the embodiment is illustrated as only the addresses C1, C2, R1, R2, and R3 corresponding to one page are generated/transmitted. However, addresses corresponding to a plurality of pages may be generated/transmitted.

The host 10 may transmit the storage device 100 with write data W-DATA accompanied by the write command 80h. Of course, the write data W-DATA may be the FPGA image.

When the write data W-DATA is completely received, the controller 110 may transmit a response indicating that the write data W-DATA is completely received, to the controller 110. The vendor-specific command may be a command for executing the FPGA image such that the FPGA 117 is updated.

Meanwhile, the controller 110 may further include a safety device for preventing the FPGA 117 from being updated additionally. For example, various devices or elements (e.g., a resistor) may be provided to physically block an FPGA image transmission path between the FPGA 117 and the nonvolatile memory device 120.

In addition, in this embodiment, the write command 80h is mentioned with regard to a write operation of the nonvolatile memory device 120, but a write command is not limited thereto. That is, in other embodiments, various kinds of write commands may be used with regard to a write operation of a nonvolatile memory device.

Figure 7:
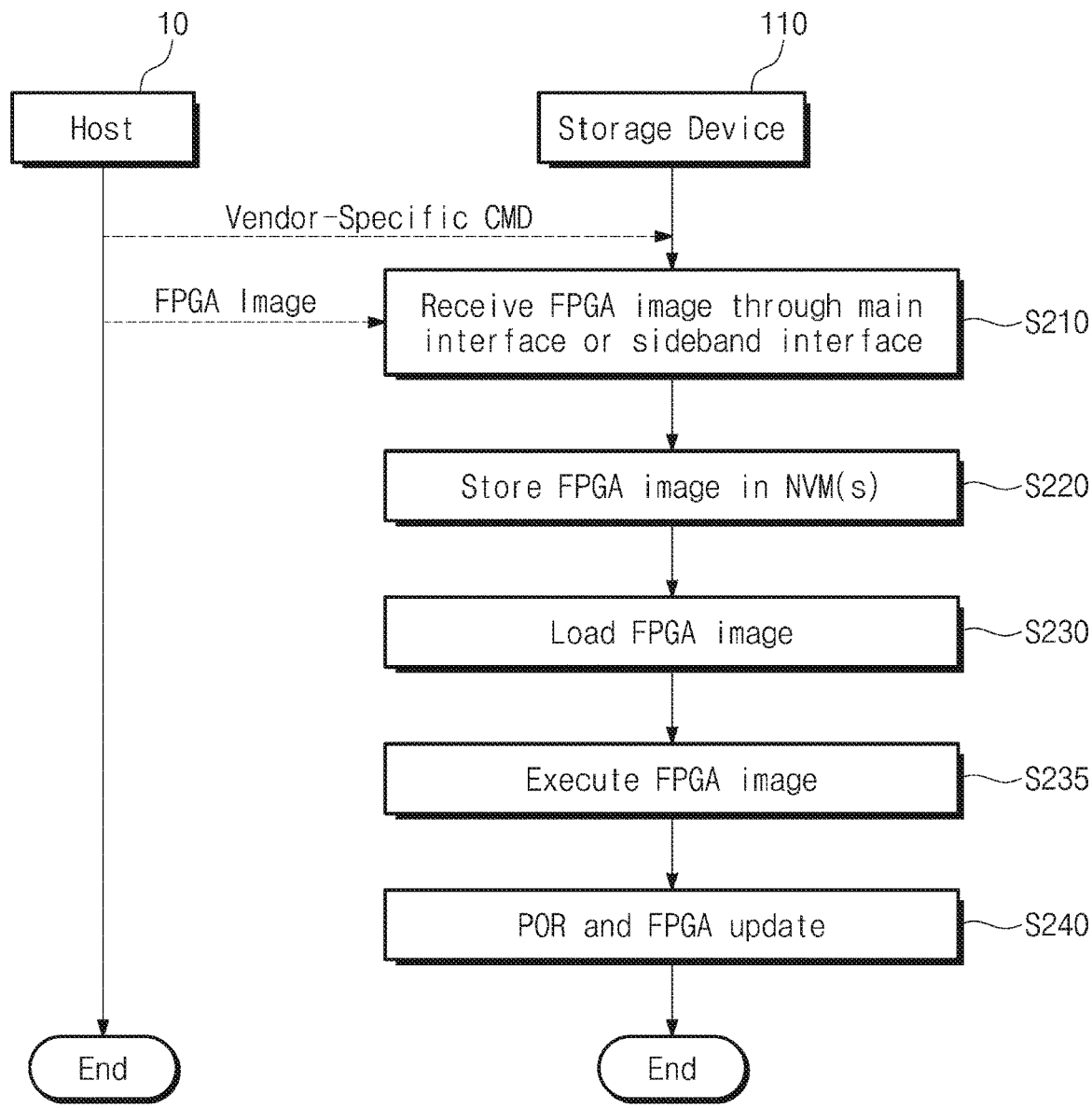
FIG. 7 is a flowchart illustrating an operation of a storage device illustrated in FIG. 4.

FIG. 7 is a flowchart illustrating an operation of a storage device illustrated in FIG. 4. The embodiment of FIG. 7 is mostly similar to the embodiment of FIG. 5 described above. Below, a difference will be mainly described. Meanwhile, an arrow indicating that a write command is input to the interface circuits 111 and 112 is illustrated by a dotted line in FIG. 4. This indicates that a write command is not used, in this embodiment. For better understanding, a description will be given with reference to FIGS. 2, 4, and 7 together.

To update the FPGA 117, the host 10 may generate the vendor-specific command and may transmit the vendor-specific command to the storage device 100. For example, the vendor-specific command may be associated with an instruction for storing the FPGA image in the nonvolatile memory device 120, an instruction for loading the stored FPGA image, and an instruction for executing the loaded FPGA image. Although not illustrated in FIG. 7, a logical address of a region, at which the FPGA image will be stored, may be generated/transmitted together.

The storage device 100 may receive the FPGA image through the main interface circuit 111 or the sideband interface circuit 112 (S220). The received FPGA image may be stored in the nonvolatile memory device 120 based on the vendor-specific command. Afterwards, the controller 110 (more specifically, the image loader 118) may load the FPGA image based on the vendor-specific command (S230), and may execute the loaded FPGA image (S235). When a power on reset operation of the storage device 100 is performed, a function to be executed by the updated FPGA may be applied to the controller 110 (S240). However, in another embodiment, the update may be applied without the power on reset operation of the storage device 100.

Figure 8:
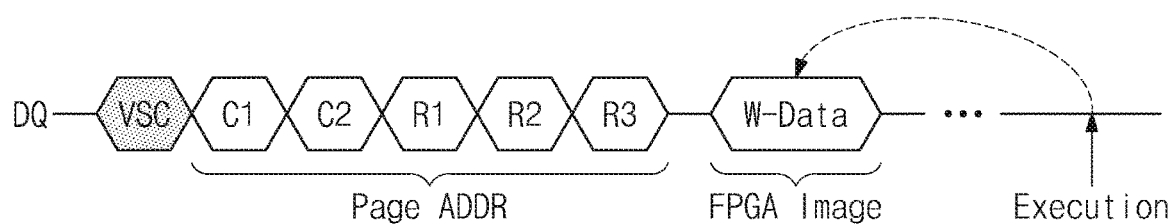
FIG. 8 is a diagram illustrating signals transmitted from a host to a storage device, in the example embodiment of FIG. 7.

FIG. 8 is a diagram illustrating signals transmitted from the host 10 to the storage device 100, in the embodiment of FIG. 7. The timing diagram illustrated in FIG. 8 is mostly similar to the timing diagram illustrated in FIG. 6. Thus, additional description will be omitted to avoid redundancy. For better understanding, a description will be given with reference to FIGS. 4 and 7 together.

To update the FPGA, the host 10 may generate a vendor-specific command VSC and a logical address of a region where the FPGA image will be stored, and may transmit the command VSC and the logical address to the storage device 100. After the vendor-specific command VSC and the logical address are completely transmitted, the host 10 may transmit write data W-DATA (i.e., the FPGA image) to the storage device 100.

The controller 110 may load and execute the FPGA image stored in the nonvolatile memory device 120 in response to the vendor-specific command VSC. Unlike the embodiment of FIG. 5 in which a separate write command 80h and the vendor-specific command are generated/transmitted, in the embodiment of FIG. 8, only the vendor-specific command VSC is generated. Therefore, data transmission efficiency of the host 10 and the storage device 100 may be improved.

Figure 9:
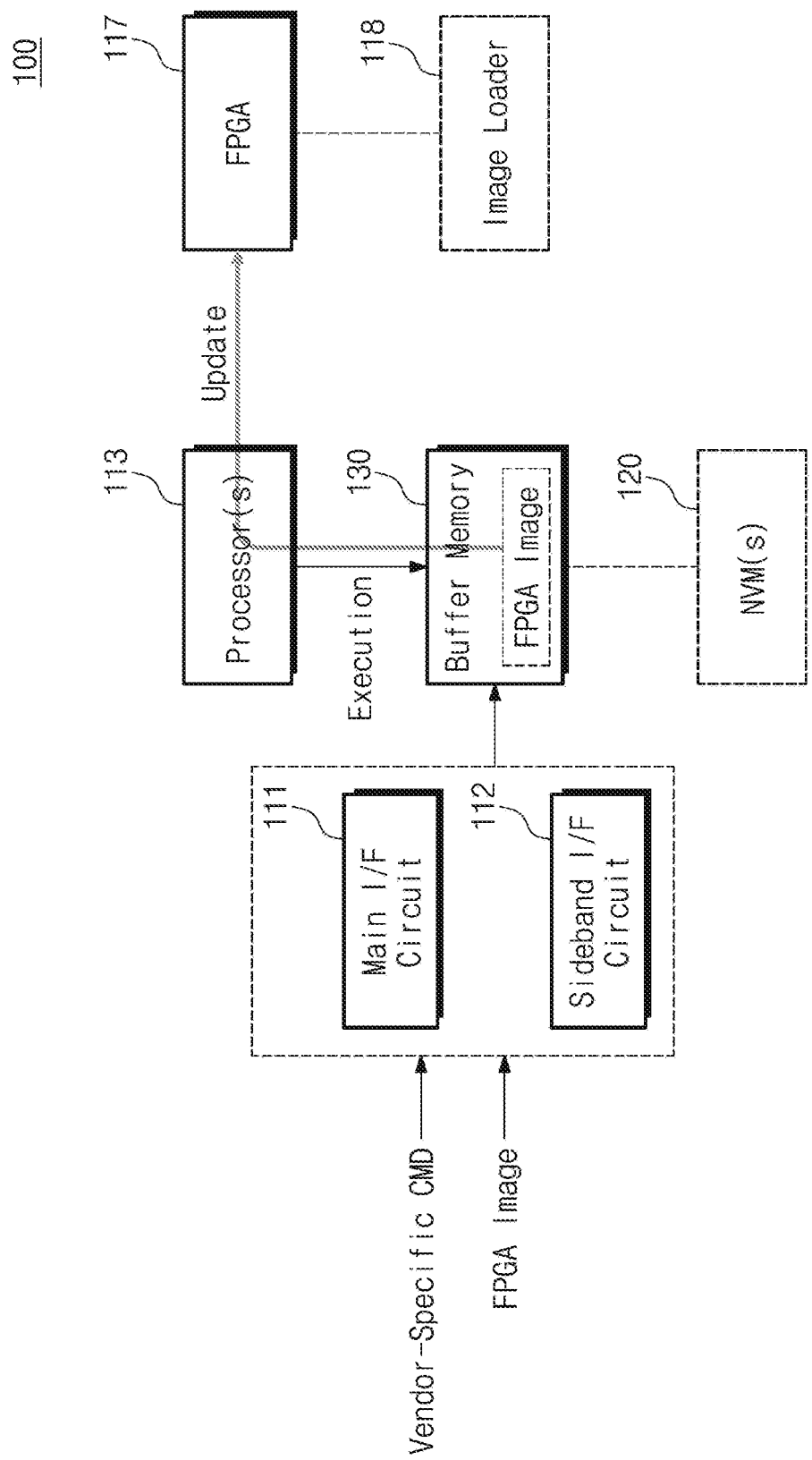
FIG. 9 is a block diagram illustrating a detailed operation of a storage device according to an example embodiment of the present disclosure.
Figure 10:
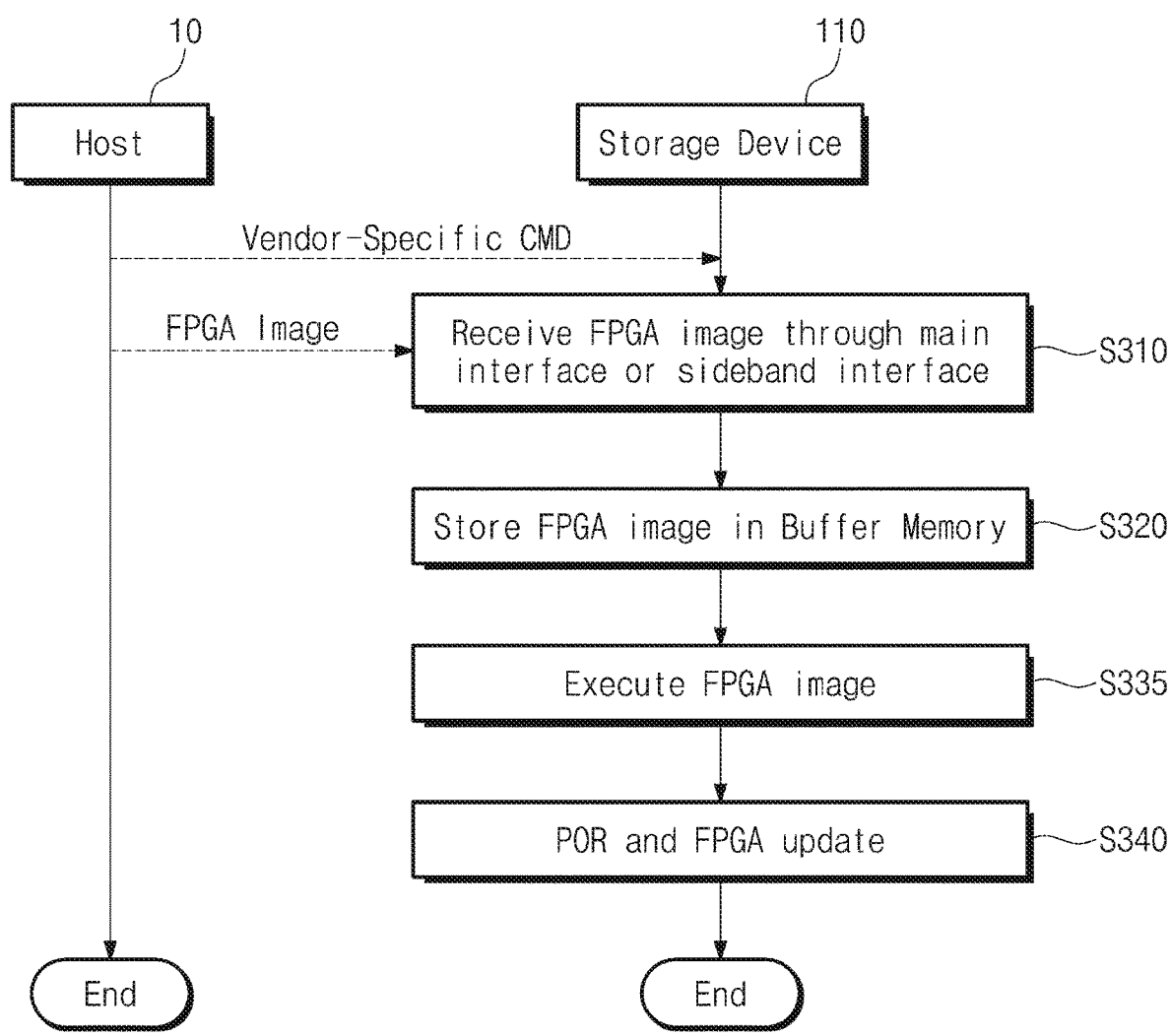
FIG. 10 is a flowchart illustrating an operation of a storage device illustrated in FIG. 9.

FIG. 9 is a block diagram illustrating a detailed operation of a storage device according to an example embodiment of the present disclosure. FIG. 10 is a flowchart illustrating an operation of a storage device illustrated in FIG. 9. For better understanding, a description will be given with reference to FIGS. 2, 9, and 10 together.

The host 10 may generate the vendor-specific command for transmitting the FPGA image to the storage device 100 and may transmit the vendor-specific command to the storage device 100.

The storage device 100 may receive the FPGA image through a main interface or a sideband interface (S310), and the received FPGA image may be stored in the buffer memory 130 (S320). When the FPGA image is completely stored, the controller 110 (more specifically, the image loader 118) may execute the FPGA image stored in the buffer memory 130 based on the vendor-specific command (S335).

Afterwards, a power on reset (POR) operation of the storage device 100 may be performed, and some functions of hardware IPs targeted for update may be updated (S340). However, in another embodiment, even though the power on reset operation of the storage device 100 is not performed, a function of the updated FPGA 117 may be immediately executed.

Figure 11:
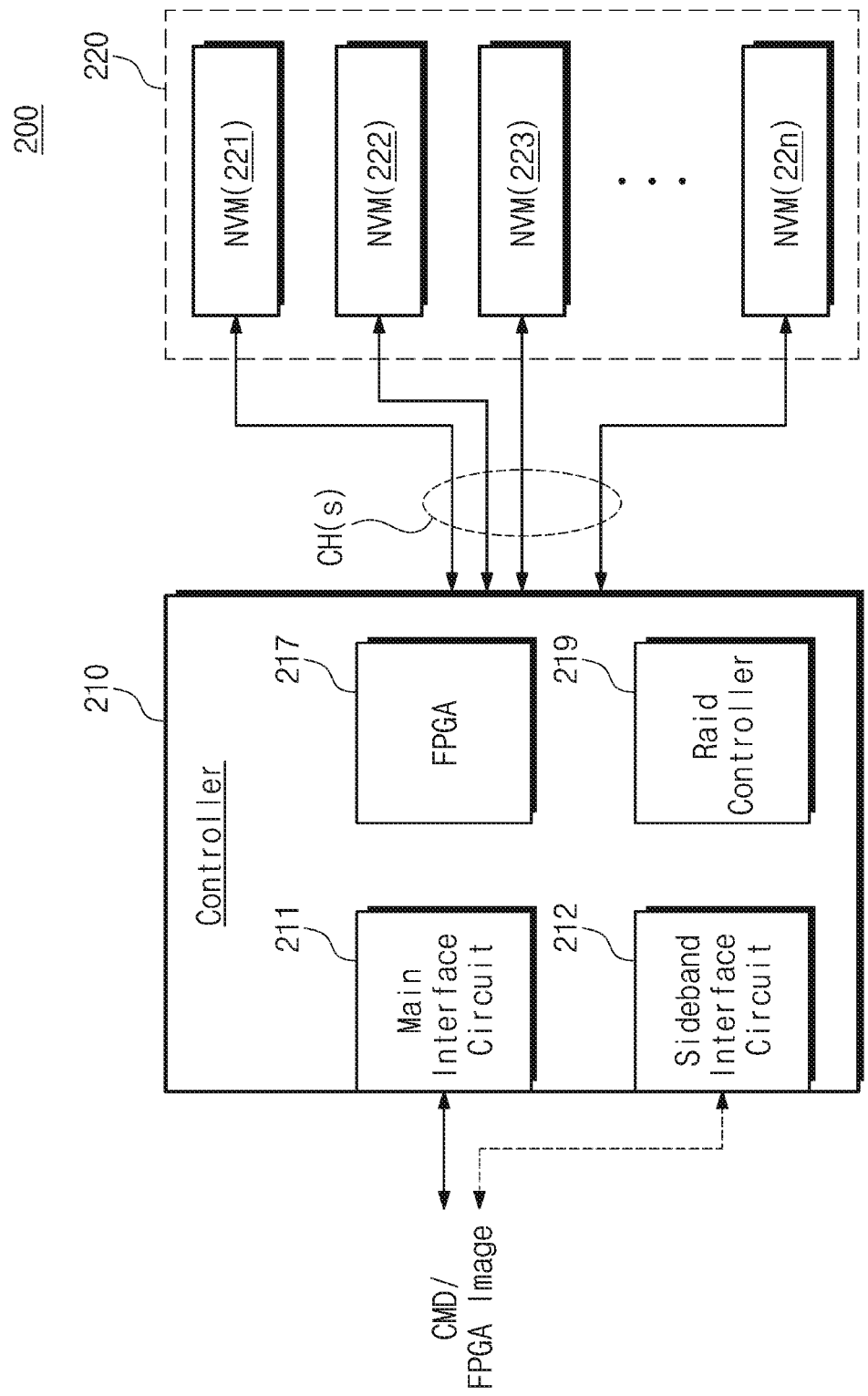
FIG. 11 is a block diagram illustrating a configuration of a storage device according to an example embodiment of the present disclosure.

FIG. 11 is a block diagram illustrating a configuration of a storage device 200 according to an example embodiment of the present disclosure. The storage device 200 may include a controller 210 and a nonvolatile memory device 220.

The controller 210 may include a main interface circuit 211, a sideband interface circuit 212, an FPGA 217, and a redundant array of inexpensive disk (RAID) controller 219. The present embodiment is mostly similar to the above-described embodiments except that the controller 210 further includes the RAID controller 219. Thus, additional description will be omitted to avoid redundancy.

The RAID controller 219 may generate pieces of RAID parity data based on the FPGA image received from a host. The pieces of RAID parity data may be distributed across and stored in at least a part of a plurality of nonvolatile memories 221 to 22n constituting the nonvolatile memory device 220. Therefore, when the FPGA image stored in the nonvolatile memory device 220 is loaded depending on a command CMD received from the host, even though a part of the pieces of RAID parity data is damaged, an original FPGA image may be recovered.

Meanwhile, in another embodiment, unlike the present embodiment for coping with the failure of the FPGA image by using the RAID controller 219, a copy of the FPGA image may be stored in each of at least some of the nonvolatile memories 221 to 22n. Alternatively, the FPGA image may be compressed in consideration of, for example, a usable capacity of the nonvolatile memory device 220. In this case, a separate circuit for compressing the FPGA image and/or firmware or software for performing a compression algorithm may be provided/loaded in the controller 210.

Figure 12:
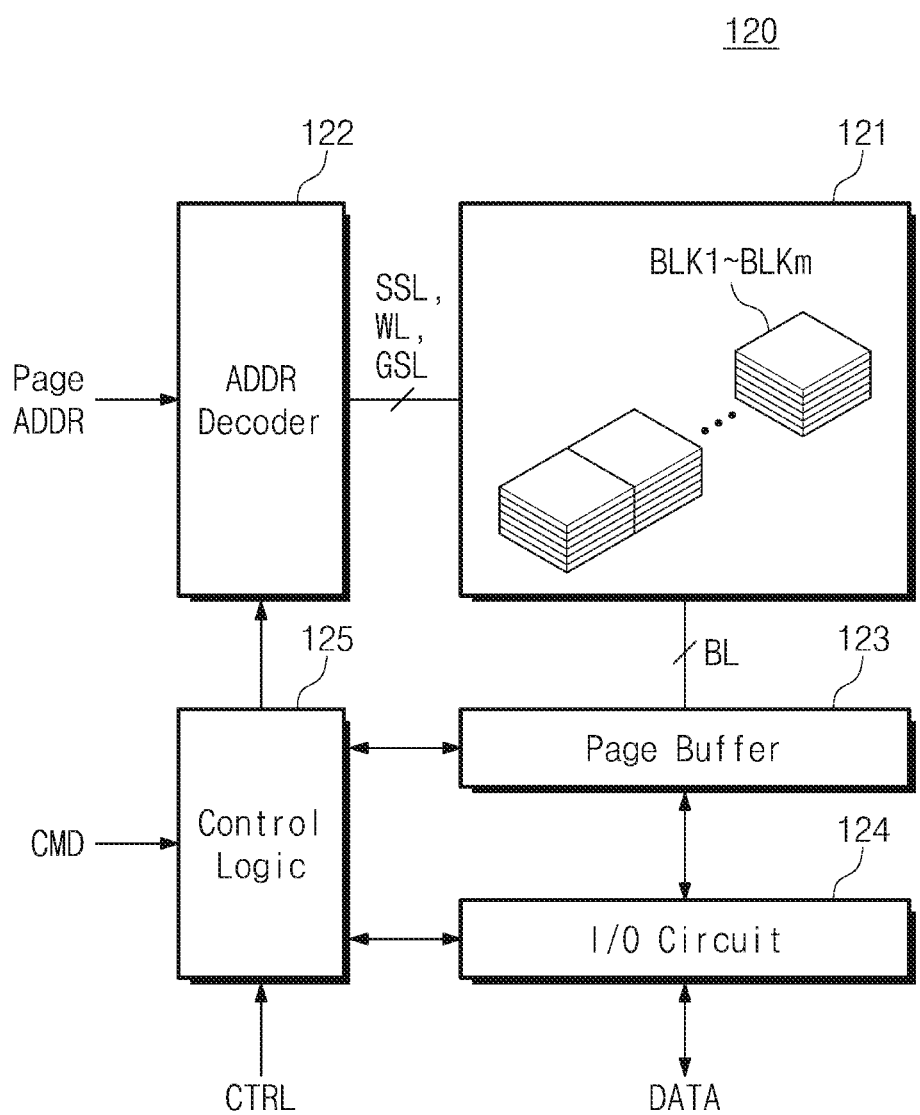
FIG. 12 is a block diagram illustrating a configuration of a nonvolatile memory device illustrated in FIG. 2.

FIG. 12 is a block diagram illustrating a configuration of the nonvolatile memory device 120 illustrated in FIG. 2. Referring to FIG. 12, the nonvolatile memory device 120 may include a memory cell array 121, an address decoder 122, a page buffer 123, an input/output circuit 124, and control logic 125.

The memory cell array 121 may include a plurality of memory blocks. Each of the memory blocks may include a plurality of cell strings. Each of the cell strings includes a plurality of memory cells. The plurality of memory cells may be connected with a plurality of word lines WL. Each memory cell may be a single level cell (SLC) storing one bit or a multi-level cell (MLC) storing at least two bits.

The address decoder 122 is connected with the memory cell array 121 through the plurality of word lines WL, string selection lines SSL, and ground selection lines GSL The address decoder 122 may receive an address ADDR from the outside, may decode the received address ADDR, and may drive the word lines WL. For example, the address ADD may be a physical address of the nonvolatile memory 120 which is obtained by converting a logical address. The above-described address conversion operation may be performed by a controller (e.g., 110 of FIG. 1) of the present disclosure or by the flash translation layer (FTL) driven by the controller 110.

The page buffer 123 is connected with the memory cell array 121 through a plurality of bit lines BL. Under control of the control logic 125, the page buffer 123 may control the bit lines BL such that data "DATA" received from the input/output circuit 124 are stored in the memory cell array 121. Under control of the control logic 125, the page buffer 123 may read data stored in the memory cell array 121 and may provide the read data to the input/output circuit 124. In an example embodiment, the page buffer 123 may receive data from the input/output circuit 124 by the page or may read data from the memory cell array 121 by the page.

The input/output circuit 124 may receive data "DATA" from an external device and may provide the received data to the page buffer 123.

The control logic 125 may control the address decoder 122, the page buffer 123, and the input/output circuit 124 in response to a command CMD and a control signal CTRL received from the outside. For example, the control logic 125 may control any other components in response to the command CMD and the control signal CTRL such that data "DATA" are stored in the memory cell array 121. Alternatively, the control logic 125 may control any other components in response to the command CMD and the control signal CTRL such that data "DATA" stored in the memory cell array 121 are transmitted to the external device. The control signal CTRL may be a signal which the controller 110 provides for the purpose of controlling the nonvolatile memory 120.

The control logic 125 may generate various voltages for the nonvolatile memory 1220 to operate. For example, the control logic 125 may generate various voltages such as a plurality of program voltages, a plurality of pass voltages, a plurality of selection read voltages, a plurality of non-selection read voltages, a plurality of erase voltages, a plurality of verification voltages, and the like. The control logic 125 may provide the generated voltages to the address decoder 122 or to a substrate of the memory cell array 121.

Figure 13:
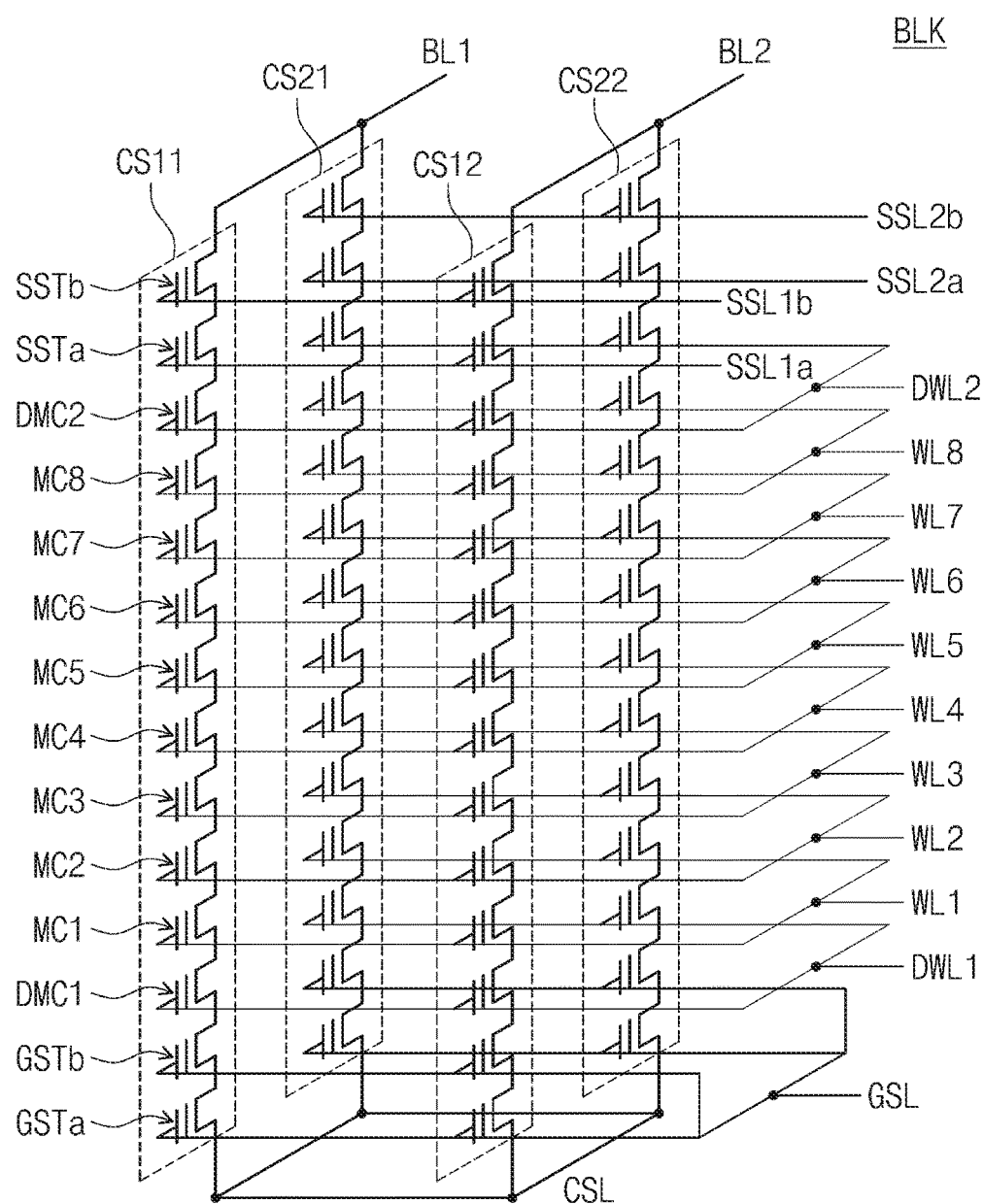
FIG. 13 is a circuit diagram illustrating an example of any one of memory blocks included in a memory cell array of FIG. 12.

FIG. 13 is a circuit diagram illustrating an example of any one of memory blocks included in a memory cell array of FIG. 12. In an example embodiment, a memory block BLK having a 3-dimensional structure will be described with reference to FIG. 12 together.

The memory block BLK may include a plurality of cell strings CS11, CS12, CS21, and CS22. The plurality of cell strings CS11, CS12, CS21, and CS22 may be arranged along a row direction and a column direction to form rows and columns.

For example, the cell strings CS11 and CS12 may be connected to string selection lines SSL1a and SSL1b to constitute a first row. The cell strings CS21 and CS22 may be connected to string selection lines SSL2a and SSL2b to constitute a second row. For example, the cell strings CS11 and CS21 may be connected to a first bit line BL1 to constitute a first column. The cell strings CS12 and CS22 may be connected to a second bit line BL2 to constitute a second column.

Each of the plurality of cell strings CS11, CS12, CS21, and CS22 includes a plurality of cell transistors. Each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In an example embodiment, each of the memory cells included in the cell strings CS11, CS12, CS21, and CS22 may be a charge trap flash (CTF) memory cell.

The memory cells MC1 to MC8 may be serially connected and may be stacked in a height direction being a direction perpendicular to a plane defined by the row direction and the column direction. In each cell string, the string selection transistors SSTa and SSTb may be serially connected and may be arranged between the memory cells MC1 to MC8 and the bit line BL1 or BL2. In each cell string, the ground selection transistors GSTa and GSTb may be serially connected and may be arranged between the memory cells MC1 to MC8 and a common source line CSL.

In an example embodiment, in each cell string, the first dummy memory cell DMC1 may be interposed between the memory cells MC1 to MC8 and the ground selection transistors GSTa and GSTb. In an example embodiment, in each cell string, the second dummy memory cell DMC2 may be interposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In an example embodiment, ground selection transistors in the same row may be connected to the same ground selection line, and ground selection transistors in different rows may be connected to another ground selection line. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In an example embodiment, even though not illustrated in FIG. 13, ground selection transistors provided at the same height from a substrate (not illustrated) may be connected to the same ground selection line, and ground selection transistors provided at different heights may be connected to different ground selection lines. For example, in the cell strings CS11, CS12, CS21, and CS22, the first ground selection transistors GSTa may be connected to the first ground selection line, and the second ground selection transistors GSTb may be connected to the second ground selection line.

Memory cells at the same height from the substrate (or the ground selection transistors GSTa and GSTb) may be connected in common to the same word line, and memory cells at different heights therefrom may be connected to different word lines. For example, the memory cells MC1 to MC8 of the cell strings CS11, CS12, CS21, and CS22 may be connected to first to eighth word lines WL1 to WL8.

String selection transistors, which belong to the same row, from among the first string selection transistors SSTa at the same height may be connected to the same string selection line, and string selection transistors, which belong to different rows, from among the first string selection transistors SSTa may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Likewise, string selection transistors, which belong to the same row, from among the second string selection transistors SSTb at the same height may be connected to the same string selection line, and string selection transistors, which belong to different rows, from among the second string selection transistors SSTb may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Even though not illustrated in FIG. 13, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an example embodiment, dummy memory cells at the same height are connected with the same dummy wordline, and dummy memory cells at different heights are connected with different dummy wordlines. For example, the first dummy memory cells DMC1 may be connected to a first dummy word line DWL1, and the second dummy memory cells DMC2 may be connected to a second dummy word line DWL2.

In the memory block BLK, read and write operations may be performed in units of rows. For example, a row of the first memory block BLK may be selected by the string selection lines SSL1a, SSL1b, SSL2a, and SSL2b.

For example, the cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. As a word line is driven, memory cells at the same height among memory cells in cell strings connected to the driven word line may be selected. The read and write operations may be performed on the selected memory cells. The selected memory cells may constitute a physical page unit.

In the memory block BLK, memory cells may be erased by the memory block or by the sub-block. When an erase operation is performed by the memory block, all memory cells MC in the memory block BLK may be simultaneously erased in response to an erase request. When the erase operation is performed by the sub-block, some of memory cells MC in the memory block BLK may be simultaneously erased in response to an erase request while the remaining memory cells thereof may be erase-inhibited. A low voltage (e.g., a ground voltage) may be supplied to a word line connected to memory cells to be erased, and a word line connected to erase-inhibited memory cells may be floated.

Figure 14:
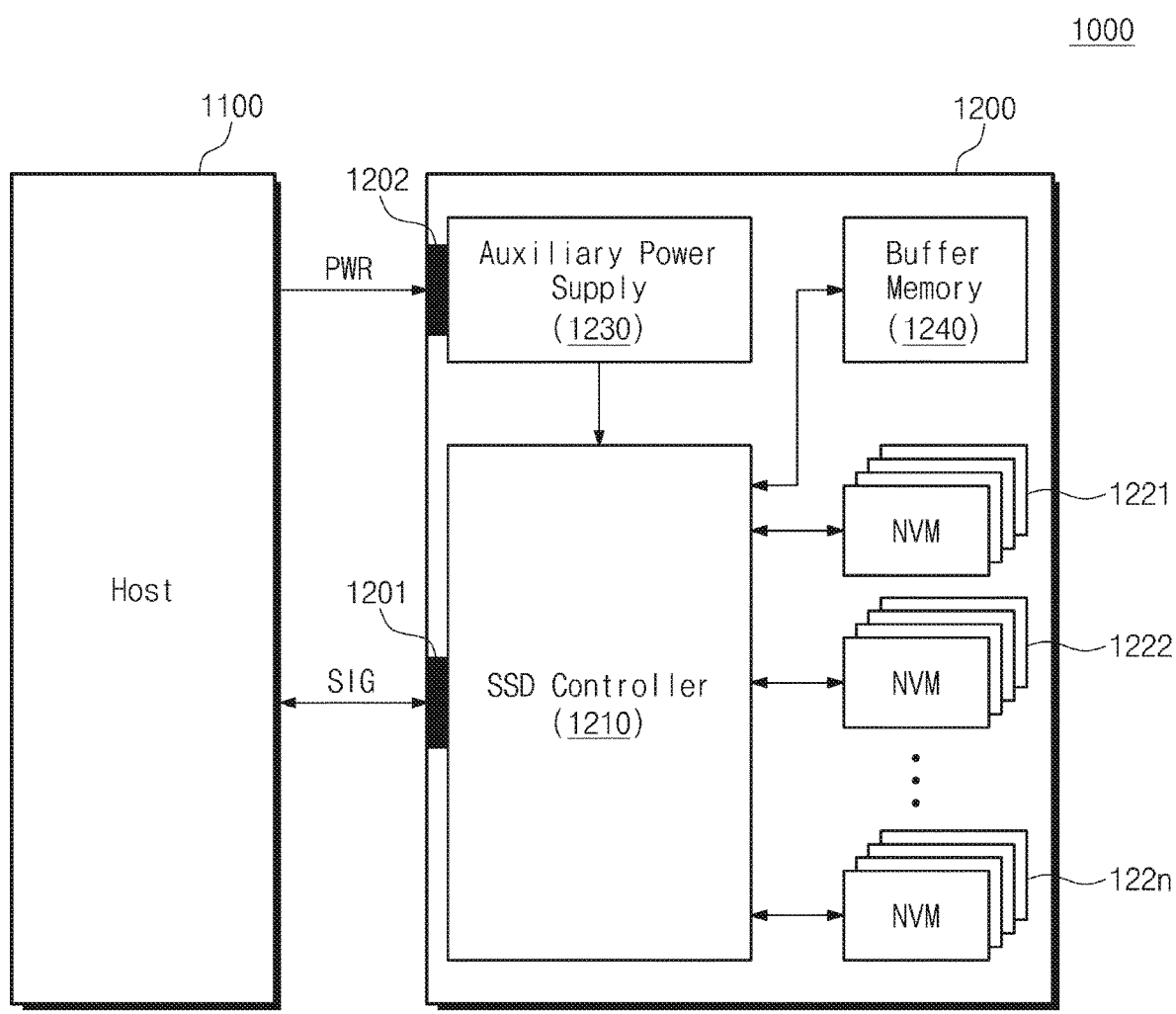
FIG. 14 is a block diagram illustrating a solid state drive system to which a nonvolatile memory device according to the present disclosure is applied.

In an example embodiment, the memory block BLK illustrated in FIG. 13 is only an example. The number of cell strings may increase or decrease, and the number of rows of cell strings and the number of columns of cell strings may increase or decrease depending on the number of cell strings. In the memory block BLK, the number of transistors (GST, MC, DMC, SST, etc.) may increase or decrease, and a height of the memory block BLK may increase or decrease as the number of transistors (GST, MC, DMC, SST, etc.) increases or decreases. In addition, the number of lines (GSL, WL, DWL, SSL, etc.) connected with cell transistors may increase or decrease as the number of cell transistors increases or decreases FIG. 14 is a block diagram illustrating a solid state drive (SSD) system 1000 to which a nonvolatile memory device according to the present disclosure is applied. Referring to FIG. 14, the SSD system 1000 may include a host 1100 and an SSD 1200.

The SSD 1200 may exchange signals SIG with the host 1100 through a signal connector 1201 and may be supplied with a power PWR through a power connector 1202. The SSD 1200 may include an SSD controller 1210, a plurality of flash memories 1221 to 122n, an auxiliary power supply 1230, and a buffer memory 1240.

The SSD controller 1210 may control the flash memories 1221 to 122n in response to a signal SIG received from the host 1100. For example, the SSD controller 1210 receives the FPGA image through a main interface or a sideband interface, based on the embodiments described with reference to FIGS. 1 to 11.

The plurality of flash memories 1221 to 122n may operate under control of the SSD controller 1210. The auxiliary power supply 1230 may be connected with the host 1100 through the power connector 1002. The auxiliary power supply 1230 may be charged by the power PWR from the host 1100. In the case where the power PWR is not smoothly supplied from the host 1100, the auxiliary power supply 1230 may provide the power of the SSD system 1200.

Figure 15:
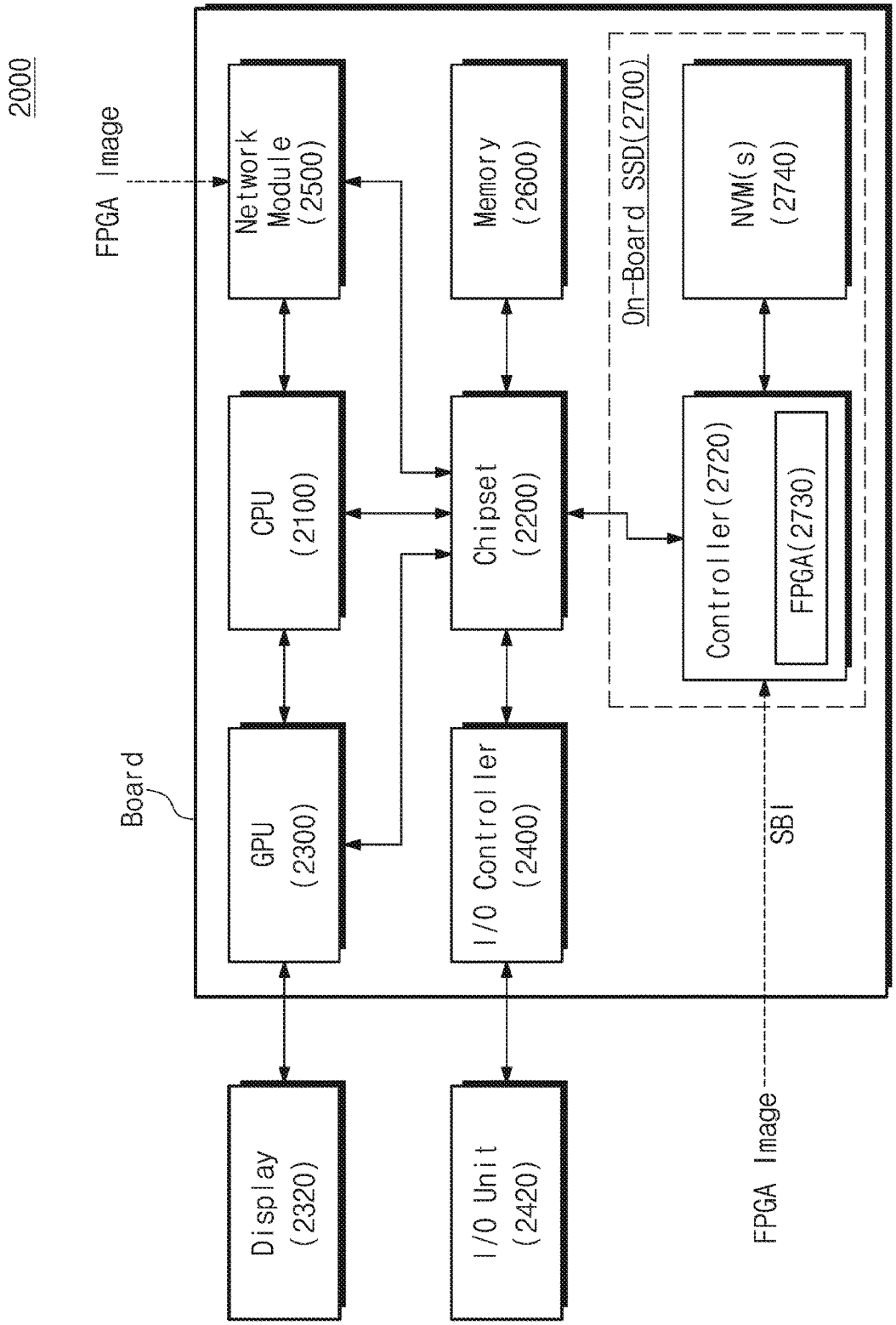
FIG. 15 is a block diagram illustrating a computing system to which a memory device according to an example embodiment of the present disclosure is applied.

FIG. 15 is a block diagram illustrating a computing system to which a memory device according to an example embodiment of the present disclosure is applied. For example, a computing system 2000 may include at least one of various electronic devices which are equipped with a side-band interface such as a desktop, a laptop, an ultra mobile PC (UMPC), a net-book, a tablet, a smartphone, etc.

Referring to FIG. 15, the computing system 2000 may include a central processing unit (CPU) 2100, a chipset 2200, a graphic processing unit (GPU) 2300, a display 2320, an input/output (I/O) controller 2400, an I/O unit 2420, a network module 2500, a memory 2600, and an on-board SSD 2700. The on-board SSD 1700 may refer to a storage device in which a controller 2720 and a nonvolatile memory device 2740, etc. constituting the storage device are directly mounted on a board.

The CPU 2100, the chipset 2200, the GPU 2300, the I/O controller 2400, the network module 2500, the memory 2600, the controller 2720, and the nonvolatile memory 2740 may be provided on a board. For example, the board may include at least one of various kinds of boards such as a printed circuit board (PCB), a flexible board, and a tape board. The board may be a flexible printed circuit board or a rigid printed circuit board, in which internal wirings are formed, or a combination thereof.

The CPU 2100 may operate an operating system OS or an application program for the purpose of operating the computing system 2000.

The chipset 2200 may control various components included in the computing system 2000 under control of the CPU 2100. For example, the chipset 2200 may control overall operations of the GPU 2300, the I/O controller 2400, the network module 2500, the memory 2600, and the on-board SSD 2700.

The GPU 2300 may process graphic data and may transmit the processed graphic data to the display 2320. The display 2320 may display the graphic data processed by the GPU 2300. A panel of the display 2320 may be a liquid crystal display (LCD) panel, an electrophoretic display panel, an electrowetting display panel, a plasma display panel (PDP), an organic light-emitting diode (OLED) display panel, etc.

The I/O controller 2400 may process information input to the computing system 2000 through the I/O unit 2420. For example, the I/O unit 2420 may be connected with the I/O controller 2400 through a personal system 2 (PS2) port, a peripheral component interconnection (PCI) slot, a dual in-line memory module (DIMM) slot, an universal serial bus (USB) port, a red, green, blue (RGB) port, a digital video interactive (DVI) port, a high definition multimedia interface (HDMI) port, etc.

The network module 2500 may provide interfacing between the computing system 2000 and an external system or a network. The network module 2500 may be configured to receive the FPGA image from an external system or a network through the above-described protocol. For example, the network module 2500 may operate based on a protocol such as a wireless-fidelity (Wi-Fi), a Bluetooth, a wireless metropolitan area network (MAN), a long term evolution advanced (LTE-A), an enhanced data rates for global system for mobile communications (GSM) evolution (EDGE), an evolved high-speed packet access (HSPA+), an Ethernet, a fibre channel, a power line communication, etc.

The memory 2600 may be used as a working memory of the computing system 2000. In booting, an OS, an application, etc. which are read from the on-board SSD 2700 may be loaded. The memory 2600 may temporarily store the FPGA image received from the outside or the FPGA image read from the nonvolatile memory device 2740. For example, the memory 2600 may be implemented with a memory module. In this case, the memory module may include a volatile random access memory, such as a DRAM, an SDRAM, a double date rate DRAM (DDR SDRAM), a DDR2 SDRAM, a DDR3 SDRAM, an LPDDR DRAM, an LPDDR2 DRAM, or an LPDDR3 DRAM or a nonvolatile random access memory, such as a PRAM, an MRAM, a RRAM, or FRAM.

The on-board SSD 2700 may include the controller 2720 including an FPGA 2730 and the nonvolatile memory device 2740. The on-board SSD 2700 may be connected with an external device or an external system through a sideband channel SBI. For example, the external device or the external system may provide the FPGA image for updating the FPGA 2730.

Although not illustrated in FIG. 15, the computing system 2000 may further include a ROM in which a basic input/output system (BIOS) is stored, a camera image processor (CIS), a battery, etc.

According to the present disclosure, since an FPGA image is received through a main interface or a sideband interface, a separate dedicated circuit for receiving the FPGA image may be unnecessary. Therefore, costs may be reduced, and the size of a storage device may be reduced.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a nonvolatile memory device, including
   a memory cell array which includes a plurality of memory cell strings, each of the memory cell strings extending in a direction vertical to a substrate, an upper end of each of the memory cell strings being connected with one of a plurality of bit lines and a lower end of each of the memory cell strings being connected with a common source line, and each of the memory cell strings including at least one string selection transistor, dummy memory cells, a plurality of memory cells, and at least one ground selection transistor, and
   a page buffer configured to store data read from the memory cell array; and
   a controller including a field programmable gate array (FPGA), the controller configured to, receive a vendor-specific command from a host device outside the storage device, and
   in response to the vendor-specific command,
   download the FPGA image via a main interface or a sideband interface, the FPGA image being from the host device such that a source of the FPGA image and the vendor-specific command are same,
   compress the downloaded FPGA image,
   store the compressed FPGA image in the nonvolatile memory device,
   load the compressed FPGA image which is stored in the nonvolatile memory device,
   decompress the compressed FPGA image which is loaded from the nonvolatile memory device, and
   execute the decompressed FPGA image to update the FPGA,
   wherein the vendor-specific command includes an address at which the compressed FPGA image to be stored in the nonvolatile memory device.

2. The storage device of claim 1, wherein the controller further includes:
   a main interface circuit configured to communicate with the host device through the main interface; and
   a sideband interface circuit configured to communicate with the host device through the sideband interface.

3. The storage device of claim 2, wherein the controller further includes:
   an image loader configured to load the FPGA image stored in the nonvolatile memory device.

4. The storage device of claim 3, further comprising:
a buffer memory configured to temporarily store the FPGA image loaded in the nonvolatile memory device.

5. The storage device of claim 1, wherein the controller further includes a redundant array of inexpensive disk (RAID) controller, the RAID controller configured to,
generate pieces of RAID parity data based on the FPGA image, and
distribute the pieces of the RAID parity data in the nonvolatile memory device.

6. The storage device of claim 1, wherein the main interface is based on at least one of a peripheral component interconnect express (PCIe), a universal serial bus (USB), a small computer system interface (SCSI), a mobile PCIe (M-PCIe), an advanced technology attachment (ATA), a parallel ATA (PATA), a serial ATA (SATA), a serial attached SCSI (SAS), integrated drive electronics (IDE), an enhanced IDE (EIDE), a nonvolatile memory express (NVMe), and universal flash storage (UFS).

7. The storage device of claim 1, wherein the sideband interface is based on at least one of a universal asynchronous receiver transmitter (UART), an inter-integrated circuit (I2C), and/or a serial programming interface (SPI).

8. A storage device comprising:
a nonvolatile memory device including,
a memory cell array which includes a plurality of memory cell strings, each of the memory cell strings extending in a direction vertical to a substrate, an upper end of each of the memory cell strings being connected with one of a plurality of bit lines and a lower end of each of the memory cell strings being connected with a common source line, and each of the memory cell strings including at least one string selection transistor, dummy memory cells, a plurality of memory cells, and at least one ground selection transistor, and
a page buffer configured to store data read from the memory cell array; and
a controller including an application specific integrated circuit (ASIC) and a field programmable gate array (FPGA), the ASIC including processing circuitry configured to perform functions, and the FPGA configured to perform at least a part of the functions of the ASIC in response to the controller,
receiving a vendor-specific command from a host device outside the storage device, and
in response to the vendor-specific command,
downloading the FPGA image from the host device through a main interface or a sideband interface such that a source of the FPGA image and the vendor-specific command are same,
compressing the downloaded FPGA image,
storing the compressed FPGA image in the nonvolatile memory device,
loading the compressed FPGA image which is stored in the nonvolatile memory device,
decompressing the compressed FPGA image which is loaded from the nonvolatile memory device, and
executing the decompressed FPGA image to update the part of the functions of the ASIC performed by the FPGA,
wherein the vendor-specific command includes an address at which the compressed FPGA image to be stored in the nonvolatile memory device.

9. The storage device of claim 8, wherein the controller further includes:
a main interface circuit configured to communicate with the host device through the main interface; and
a sideband interface circuit configured to communicate with the host device through the sideband interface.

10. The storage device of claim 8, wherein the sideband interface is based on at least one of a universal asynchronous receiver transmitter (UART), an inter-integrated circuit (I2C), and/or a serial programming interface (SPI).

11. A method of operating a storage device which includes a nonvolatile memory device, a controller including a field programmable gate array (FPGA), the nonvolatile memory device including a memory cell array and a page buffer configured to store data read from the memory cell array, the memory cell array including a plurality of memory cell strings, each of the memory cell strings extending in a direction vertical to a substrate, an upper end of each of the memory cell strings being connected with one of a plurality of bit lines and a lower end of each of the memory cell strings being connected with a common source line, and each of the memory cell strings including at least one string selection transistor, a plurality of memory cells, and at least one ground selection transistor, the method comprising:
receiving a vendor-specific command from a host device outside the storage device; and
in response to the vendor-specific command,
downloading the FPGA image from the host device through a main interface or a sideband interface such that a source of the FPGA image and the vendor-specific command are same;
compressing the downloaded FPGA image;
storing the compressed FPGA image in the nonvolatile memory device at the address received from the host device;
loading the compressed FPGA image stored in the nonvolatile memory device;
decompressing the compressed FPGA image which is loaded from the nonvolatile memory device; and
executing the decompressed FPGA image to update the FPGA, wherein
the vendor-specific command includes an address at which the compressed FPGA image to be stored in the nonvolatile memory device.

12. The method of claim 11, wherein the controller further includes an image loader configured to load the FPGA image stored in the nonvolatile memory device.

13. The method of claim 11, wherein
the main interface is based on at least one of a peripheral component interconnect express (PCIe), a universal serial bus (USB), a small computer system interface (SCSI), a mobile PCIe (M-PCIe), an advanced technology attachment (ATA), a parallel ATA (PATA), a serial ATA (SATA), a serial attached SCSI (SAS), integrated drive electronics (IDE), an enhanced IDE (EIDE), a nonvolatile memory express (NVMe), and universal flash storage (UFS), and
the sideband interface is based on at least one of a universal asynchronous receiver transmitter (UART), an inter-integrated circuit (I2C), and/or a serial programming interface (SPI).

14. The storage device of claim 1, wherein the controller is configured to, in response to the vendor-specific command, execute the FPGA image without power on reset.

15. The storage device of claim 8, wherein executing the FPGA image is performed without power on reset.

16. The method of claim 11, wherein executing the FPGA image loaded from the nonvolatile memory device is performed without power on reset.

17. The storage device of claim 1, wherein an upper end of a first memory cell string and an upper end of a second memory cell string, from among the plurality of memory cell strings, are connected to a first bit line from among the plurality of bit lines, wherein an upper end of a third memory cell string and un upper end of a fourth memory cell string, from among the plurality of memory cell strings, are connected to a second bit line from among the plurality of bit lines.

18. The storage device of claim 17, wherein each of the first through the fourth memory cell strings includes serially-connected string selection transistors,
- wherein a first one of the serially-connected string selection transistors of each of the first and the third memory cell string are connected to a first string selection line,
- wherein a second one of the serially-connected string selection transistors of each of the first and the third memory cell string are connected to a second string selection line,
- wherein a first one of the serially-connected string selection transistors of each of the second and the fourth memory cell string are connected to a third string selection line, and
- wherein a second one of the serially-connected string selection transistors of each of the second and the fourth memory cell string are connected to a fourth string selection line.

19. The storage device of claim 1, wherein each of the memory cells included in the first through the fourth memory cell strings is a charge trap flash memory cell.

20. The storage device of claim 18, wherein the serially-connected string selection transistors of the first memory cell string are arranged between the first bit line and the plurality of memory cells of the first memory cell string,
- wherein the serially-connected string selection transistors of the second memory cell string are arranged between the first bit line and the plurality of memory cells of the second memory cell string,
- wherein the serially-connected string selection transistors of the third memory cell string are arranged between the second bit line and the plurality of memory cells of the third memory cell string, and
- wherein the serially-connected string selection transistors of the fourth memory cell string are arranged between the second bit line and the plurality of memory cells of the fourth memory cell string.

21. The storage device of claim 18, wherein each of the first through the fourth memory cell strings includes serially-connected ground selection transistors,
- wherein the serially-connected ground selection transistors of the first memory cell string are arranged between the common source line and the plurality of memory cells of the first memory cell string,
- wherein the serially-connected ground selection transistors of the second memory cell string are arranged between the common source line and the plurality of memory cells of the second memory cell string,
- wherein the serially-connected ground selection transistors of the third memory cell string are arranged between the common source line and the plurality of memory cells of the third memory cell string, and
- wherein the serially-connected ground selection transistors of the fourth memory cell string are arranged between the common source line and the plurality of memory cells of the fourth memory cell string.

22. The storage device of claim 21, wherein a first one of the dummy memory cells of each of the first through the fourth memory cell strings is connected between corresponding serially-connected string selection transistors and corresponding plurality of memory cells, and
- wherein a second one of the dummy memory cells of each of the first through the fourth memory cell strings is connected between corresponding serially-connected ground selection transistors and corresponding plurality of memory cells.

23. The storage device of claim 20, wherein when a turn-on voltage is supplied to the serially-connected string selection transistors of each of the first and the third memory cell strings and turn-off voltage is supplied to the serially-connected string selection transistors of each of the second and the fourth memory cell strings, the first and the third memory cell string are electrically connected to the first and the third bit lines, respectively, and
- wherein when the turn-on voltage is supplied to the serially-connected string selection transistors of each of the second and the fourth memory cell strings and turn-off voltage is supplied to the serially-connected string selection transistors of each of the first and the third memory cell strings, the second and the fourth memory cell string are electrically connected to the first and the third bit lines, respectively.

* * * * *